United States Patent [19]
Colmant et al.

[11] Patent Number: 5,519,701
[45] Date of Patent: May 21, 1996

[54] ARCHITECTURE FOR HIGH PERFORMANCE MANAGEMENT OF MULTIPLE CIRCULAR FIFO STORAGE MEANS

[75] Inventors: Michel M. Colmant, Kain, Belgium; Robert W. Krug, Manassas, Va.; Alexander A. Smith, Carrollton, Tex.

[73] Assignee: International Business Machines Corporation, Armonk, N.Y.

[21] Appl. No.: 412,812

[22] Filed: Mar. 29, 1995

[51] Int. Cl.$^6$ .................................................. H04L 12/56
[52] U.S. Cl. .......................... 370/60.1; 370/61; 370/85.1; 370/94.2
[58] Field of Search .............................. 370/60, 60.1, 61, 370/85.1, 85.2, 85.3, 85.4, 85.5, 85.6, 85.15, 94.1, 94.2

[56] References Cited

U.S. PATENT DOCUMENTS

| | | | |
|---|---|---|---|
| 4,507,760 | 3/1985 | Fraser | 365/221 |
| 4,611,322 | 9/1986 | Larson et al. | 320/60 |
| 4,682,284 | 7/1987 | Schrofer | 364/200 |
| 4,807,111 | 2/1989 | Cohen et al. | 364/200 |
| 4,816,996 | 3/1989 | Hill et al. | 364/200 |
| 4,888,739 | 12/1989 | Frederick et al. | 365/221 |
| 4,914,652 | 4/1990 | Nguyen | 370/85.5 |
| 4,951,280 | 8/1990 | McCool et al. | 370/85.12 |
| 5,043,981 | 8/1991 | Firoozmand et al. | 370/85.1 |
| 5,065,397 | 11/1991 | Shiobara | 370/85.5 |
| 5,119,374 | 6/1992 | Firoozmand et al. | 370/85.4 |
| 5,136,582 | 8/1992 | Firoozmand | 370/85.1 |
| 5,448,558 | 9/1995 | Gildea et al. | 370/60 |

FOREIGN PATENT DOCUMENTS 459753  12/1991  European Pat. Off. .

OTHER PUBLICATIONS

Electronics OGGI, No. 97, of Mar. 31, 1990, pp. 101–109, by Emanuele Dal Lago, entitled "Quando Risc Si Unisce A Cisc".

Proceedings of SPIE, The International Society for Optical Engineering, vol. 1577 entitled "High–Speed Fiber Networks & Channels," held Sep. 1991, pp. 86–96, by R. Venkataraman, article entitled *Designing a VMEbus FDDI Adaptor Card'*.

Digital Technical Journal, vol. 3, No. 2, Spring 1991, by W. R. Hawe et al., pp. 10–18, entitled "Fiber Distributed Data Interface Overview".

IBM Technical Disclosure Bulletin, vol. 24, No. 6, Nov. 1981, pp. 2716–2723, by E. D. Conroy, entitled "Hardware/Microcode Support of Queuing".

*Primary Examiner*—Wellington Chin
*Attorney, Agent, or Firm*—Joseph C. Redmond, Jr.; John D. Flynn

[57] ABSTRACT

A queue manager manages multiple interfaces among a network, a host bus and a storage means including multiple circular FIFO's in a data communication system handling packet and multimedia data transferred, in either direction, between the host bus and the network. The queue manager includes a programmable parameter RAM interface, computation logic and status means. An efficient queue management algorithm dynamically manages storage of data in the circular multiple FIFO's as data is transferred, in either direction, between the host bus and the network. System bandwidth is allocated by the queue manager to the queues which have the most activity thereby improving the speed of transferring data while reducing the amount of bandwidth that would otherwise be required by prior systems. The programmable interface permits a user to define and dynamically configure the multiple circular FIFO storage means to include other parameters useful in the management of data transferred between the host bus and the network.

11 Claims, 8 Drawing Sheets

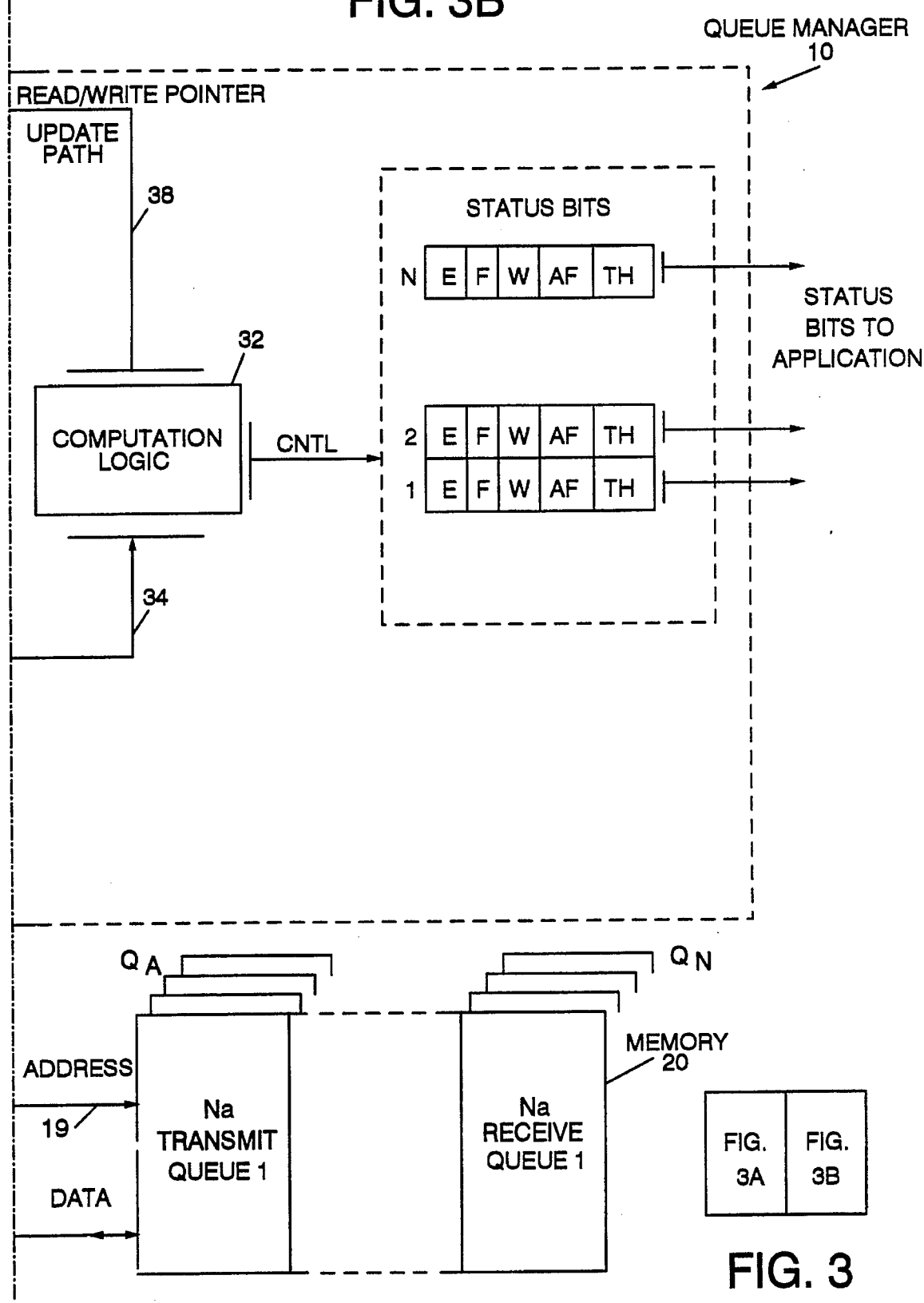

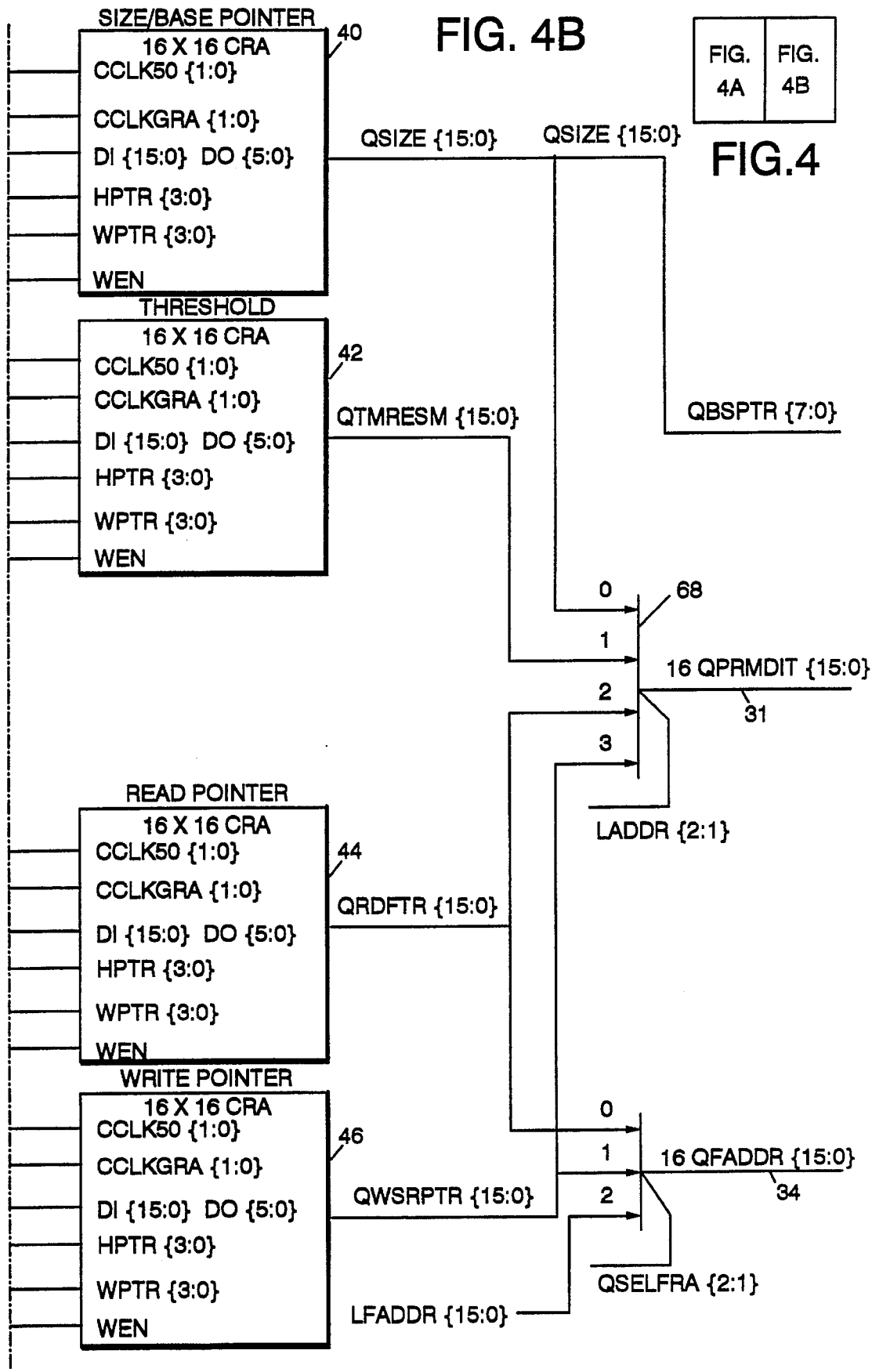

ARCHITECTURE FOR HIGH PERFORMANCE MANAGEMENT OF MULTIPLE CIRCULAR FIFO STORAGE MEANS

PRIOR ART REFERENCES TO RELATED APPLICATIONS

This application is related to the following co-pending application owned by the assignee of this invention and filed as follows: J. Hauris et al., Ser. No. 08/282,376, for "Multimedia Communication Apparatus and Method", filed Jul. 29, 1994, which is incorporated herein by reference.

1. Technical Field

This invention relates to data communication systems. More particularly, the invention relates to apparatus and methods for managing data in multiple circular FIFO storage means in a data communication system. Specifically, the invention relates to an efficient management of packet traffic, as well as real-time traffic (multimedia, voice/video) and apparatus and methods for providing a wide range of signals indicative of the status of packet and multimedia data handled by multiple circular FIFO storage means in such data or communication system.

2. Background of the Invention

Multiple circular FIFO's are extensively used in data communication applications to buffer incoming/outgoing data. One such system is shown in U.S. Pat. No. 4,507,760 entitled "First-In, First-Out (FIFO) Memory Configuration For Queue Storage" to A. Fraser issued Mar. 26, 1985. Fraser discloses a random access memory (RAM) organized in a FIFO memory and a control circuit to implement queue management for incoming/outgoing data in a digital communication system. A read pointer addresses the execution in the RAM from where a word may be read. A write pointer addresses the location in the RAM where a word may be entered. A third pointer addresses the location in the RAM where the last word of a complete message is stored. Fraser discloses message validation means and means responsive to message validation means for identifying the end of valid messages for termination the reading of the messages thereby avoiding the problem of abandoning a message after inserting some of it into a FIFO queue.

Another example of multiple circular FIFO's and data administration is described in U.S. Pat. No. 4,682,284 entitled "Queue Administration Method and Apparatus" to E. P. Schrofer, issued Jul. 21, 1987. Schrofer discloses a queue administration circuit which stores a request in a queue and then awaits the results of a validity check on the stored request. If the request is found to be invalid, the administration discards the request from the queue and then permits the invalid request to be overwritten by the next receive request.

Another example of the use of multiple circular FIFO's in data communications systems is described in U.S. Pat. No. 5,043,981, entitled "Method of and System for Transferring Multiple Priority Queues Into Multiple Logical FIFO's Using A Single Physical FIFO", to F. Firoozmand et al., issued Aug. 27, 1991. Firoozmand et al. disclose data transferred one queue at a time from a system memory to an output buffer through a single physical FIFO. To prevent the FIFO from "locking up" as a result of any residual data remaining therein following each transfer of a frame to the output buffer, the storage remaining available is detected for a particular queue of the output buffer to be transmitted to the medium. Data is transferred from the system memory to the FIFO memory only if the storage remaining available is at least equal to the storage capacity of the FIFO memory.

In still another example, U.S. Pat. No. 4,807,111 entitled "Dynamic Queuing Method" to E. I. Cohen et al., issued Feb. 21, 1989, assigned to the same assignee as that of the present invention, discloses managing a large number of queues used by a system control program to control reusable hardware and software resources of a data processing system. The invention increases the efficiency of processing a queue by deleting from the queue those elements that no longer represent requests for service. Any new or deleted element is inserted in the queue when it receives or leaves one request for the service. The invention performs its element deletion and insertion in a coordinating manner that maintains the integrity of the queue by dealing with contention conditions among multiple processors vying for work while speeding up the queue management operation.

Still another queue management system is described in U.S. Pat. No. 4,816,996 entitled "Queued Serial Peripheral Interface for Use in a Data Processing System" to S. C. Hill et al., issued Mar. 28, 1989. Hill et al. relates to a serial interface for data communications between components of a data processing system. The serial interface is queued by a queue pointer which indicates one of a plurality of stored serial transfers and control means for executing each of said stored serial transfers in accordance with command control data and control information. The queue pointer means is altered by the command control data and control information for indicating when each of said stored serial transfers has been executed.

Another queue administration apparatus and method is disclosed in U.S. Pat. No. 4,682,284, entitled "Queue Administration Method and Apparatus" to C. P. Schrofer, issued Jul. 21, 1987. Schrofer discloses apparatus for administering a queue when the queue is empty, and an executing unit is ready to receive a request, whereupon the queue is bypassed. The request is received directly by the executing unit. Otherwise, the queue administration circuit stores the request in the queue and checks the validity of the request. An invalid request is discarded. The invalid request is overwritten by the next received request.

Another queue management system is disclosed in U.S. Pat. No. 4,888,739 entitled "First-In First-Out Buffer Memory with Improved Status Flags", to Bruce Frederick et al., issued Dec. 19, 1989. Frederick discloses a FIFO buffer memory that provides signals indicative of the status of data stored in the buffer memory. The buffer memory indicates memory empty and memory full conditions but also indicates conditions such as almost empty, almost full, and half full whereby writing and reading operations may be more conveniently terminated or initiated as the case may be before data loss or false data is obtained.

None of the prior art discussed above allows a user to dynamically define and configure one (1) to "n" queues using multiple programmable control parameters in a data communication system transferring packet and multimedia data between a host bus and a network bus. Nor does the prior art manage the reading and writing of a program queue through a comprehensive and elaborate set of status bits which indicates whether a queue is empty or full or wrapped or almost full or a threshold has been exceeded. Nor does the prior art allow the programmable control parameter and status bits to be expanded for more or less control of multiple circular FIFO's.

SUMMARY OF THE INVENTION

Accordingly, it is an object of the present invention to provide improved queue management for multiple circular FIFO storage means in a data communication system handling packet and multimedia data.

Another object is an extensive and comprehensive set of parameters for managing multiple circular FIFO storage means.

Another object is a set of programmable control parameters which permit a user to define and dynamically configure multiple circular FIFO storage means.

Still another object is a set of parameter RAM and status bits for multiple circular FIFO storage means whereby the parameters and status bits are expandable to include other parameters useful in the management of the multiple FIFO's.

In accordance with an illustrative embodiment of the present invention, a queue manager for multiple circular FIFO storage means in a data communication system handling packet and multimedia data transferred, in either direction between a host bus and a network system, comprises a parameter RAM, computation logic and status means for generating a comprehensive set of programmable signals for managing multiple circular FIFO storage means. A programmable parameter RAM provides (i) a base pointer for each queue which is the starting location in memory; (ii) queue size or quantity of data; (iii) a threshold value indicative of when data can be transferred out of the queue; (iv) an "almost full" control indication of the amount of space or room left in a queue, and used to set an "almost full" status line; (v) a read pointer set to the base pointer initially; and (vi) a write pointer set to the base pointer initially. The computation logic exercises the parameters to generate output control signals used to update status bits for the queue being serviced. The computation logic increments the memory address, calculates a limit which is the value of the top of the queue which is compared with the incremented memory address to control gating the base pointer into the read/write pointer array. The computation logic further calculates the space or room available in the queue using a three input adder which calculates the ones complement of the data amount filled in the queue. A two-input adder generates a carry when the queue is empty. Another three-input adder generates a carry when the amount filled in the queue is equal to or greater than the threshold value in the queue. The full sum of the computation logic is zero detected to produce "full" and "almost full" status control signals. The status bits are used by an application in the handling of data to and from the multiple storage queues.

The queue manager is adapted to manage multiple interfaces among a network, a host bus and a storage interface using an efficient queue management algorithm which provides means for dynamically allocating system bandwidths to the queues which have the most activity thereby improving the speed of transferring data while reducing the amount of system bandwidth that would otherwise be required in the prior art systems.

BRIEF DESCRIPTION OF THE DRAWINGS

FIG. 3 is an orientation diagram of FIGS. 3A and 3b for the queue manager system of FIG. 1.

FIGS. 3A and 3B are block diagrams of the queue manager system shown in FIG. 1.

FIG. 4 is an orientation diagram of FIGS. 4A and 4B for a parameter RAM included in the queue management system of FIG. 3.

FIGS. 4A and 4B are block diagrams for a parameter RAM included in the queue management system of FIG. 3.

DETAILED DESCRIPTION OF THE INVENTION

Figure 1:
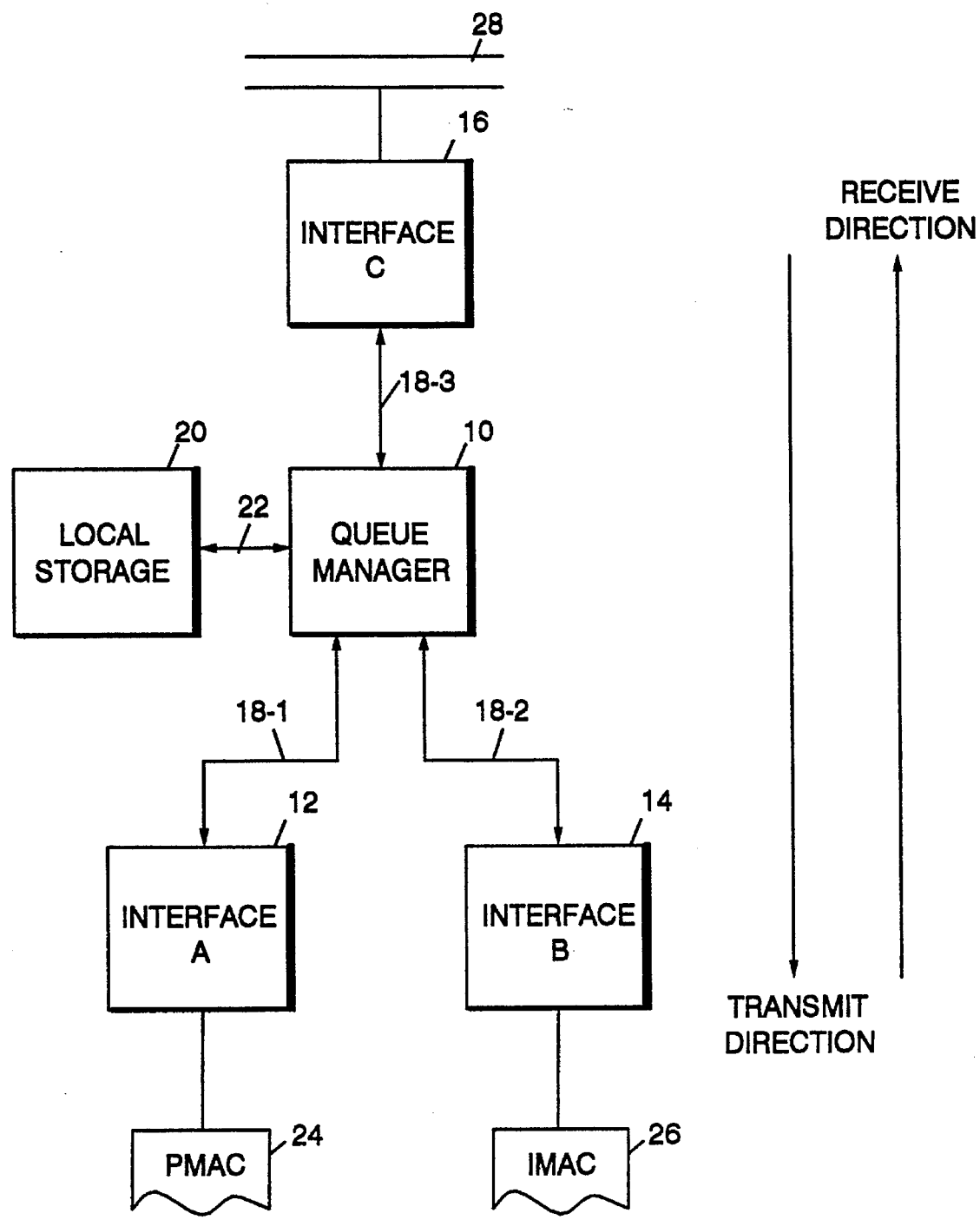
FIG. 1 is a block diagram of a queue management system incorporating the principles of the present invention.

Referring to FIG. 1, a queue manager 10 is adapted to manage the transfer of data among multiple interfaces 12, 14 and 16 through transfer buses 18-1, 18-2 and 18-3. Each interface typically has limited storage capacities in the form of internal FIFO's (not shown) to adjust to the data rate of a device (not shown) with which it interfaces. Usually the internal FIFO's do not have enough capacity to provide sufficient buffering for the traffic coming from other interfaces. Also, the buses may be controlled, in which case, an interface may not be able to access the bus because it has not been granted access. To handle this condition, a local storage 20 is coupled to the manager 10 through bus 22. To handle the excess data, the local storage 20 is organized in a series of transmit and receive queues.

In a specific example, interface 12 is coupled to a packet data media access control(PMAC) device 24. Packets can be received and transmitted to/from different queues in storage 20, each queue corresponding to a specific type of packet data, i.e., asynchronous, synchronous, media access control, and SMT. In the storage 20, there are N(a) receive queues and N(a) transmit queues (See FIG. 3B). Interface 14 is responsible for receiving and transmitting real-time, isochronous, traffic data. Interface 14 is coupled to an isochronous medium access control (IMAC) device 26. The isochronous data is organized in storage 20 in different queues than the packet queues in which each isochronous queue corresponds to a specific voice channel, video, etc., data. There are N(b) receive and N(b) transmit queues. Interface 16 is responsible for accessing a host bus 28 for all types of traffic, packet and isochronous data. Accordingly, interface 16 handles Nc receive and N(c) transmit queues, where Nc=maximum (Na, Nb). Typically, packet data arrives in bursts. Also, packet data can only be transmitted when medium access has been granted through a timed-token protocol on a network (not shown). Storage of packet data is required in local storage 20 to provide for the difference in data rates between the host bus interface 16 and the PMAC 24. Isochronous data, on the other hand, is received and transmitted at a constant data rate. Isochronous data is also stored in storage 20 to provide temporary buffering between the constant data rate of the IMAC 26 and the high but bursty data rate of the host bus 28. The queue manager 10 is required to arbitrate and manage the transfer of data among the different interfaces 12, 14, and 16 and between these interfaces and local storage 20. Data is only moved a word at a time. The queue manager 10 has to handle a number of 2 * Na+2 * Nb+2, Nc interface FIFO's. In one form, Na=3, Nb=Nc=8, the total number of interface FIFO's is 38 in such an embodiment. Loading or emptying these FIFO's has to be done in such a way that any FIFO neither underruns nor overflows, which could lead to loss of data or loss of system synchronization. The management and arbitration provided by the queue manager 10 has to be done in such a way that active queues with high traffic have a higher priority than low traffic queues. Also, active queues with no traffic should not take any queue manager bandwidth.

Figure 2:
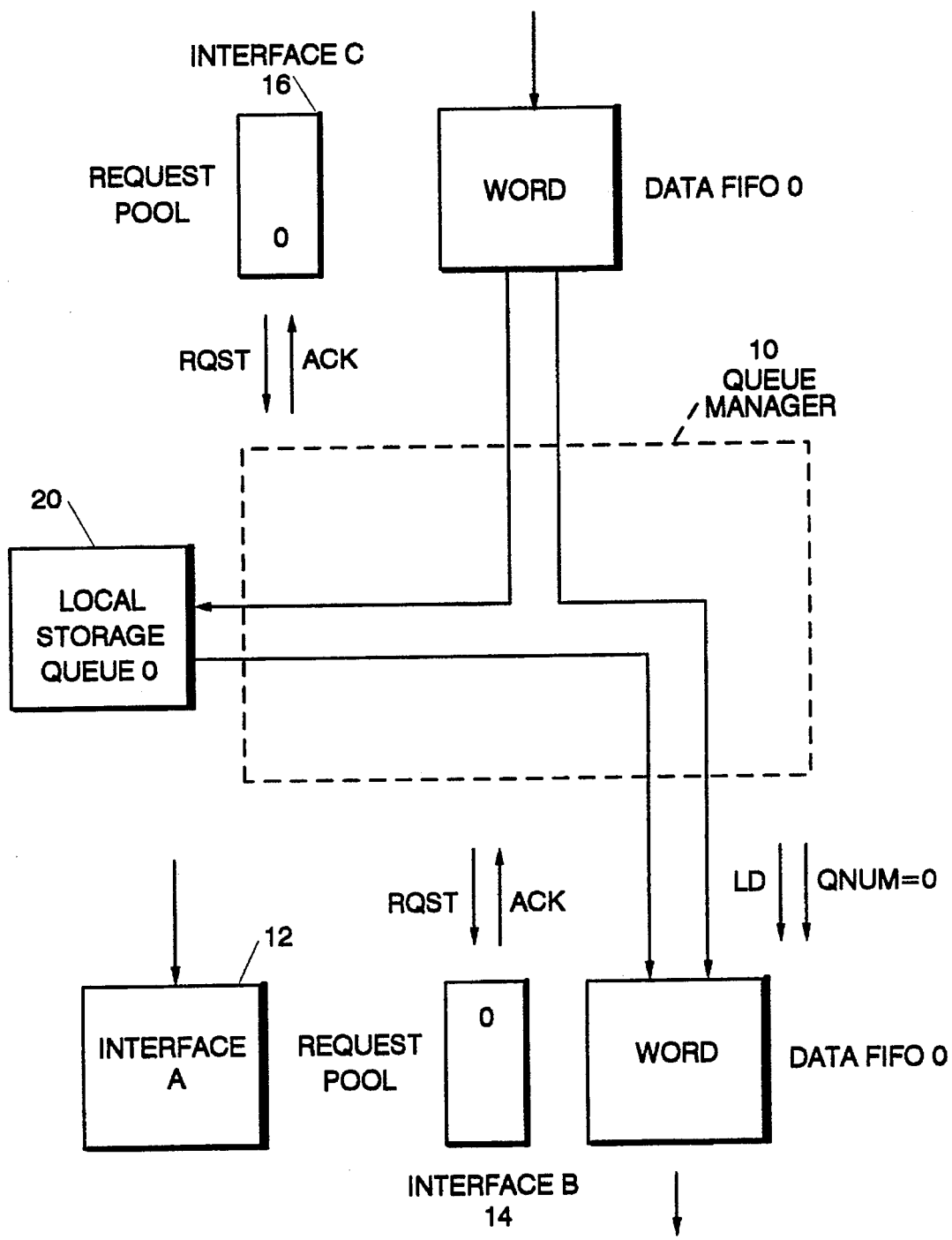
FIG. 2 is a block diagram of data flow in the queue management system of FIG. 1.

Referring to FIG. 2, a novel method of dynamic prioritization of queue servicing by the queue manager 10 is disclosed. Each interface 12, 14, 16, prioritizes service between its own FIFO and the queue manager 10 only arbitrates on an interface basis instead of a queue basis. Accordingly, the queue manager has to handle only 6 interfaces (three,*2, 1 receive and 1 transmit) instead of 38 FIFO's. The queue manager can handle direct transfer of data between interfaces without going through local storage 20. Also, the queue manager handles data transfers to and from the local storage and from and to any interface. The following support is needed by the queue manager to achieve this dynamic prioritization of queue servicing:

1. Each interface provides a pool of outstanding requests. This request pool is organized as a FIFO and contains the queue number of the FIFO's that require servicing, either read or write at that interface. If interface 12, for instance, receives a data word from the PMAC 24 destined for queue 2 in storage, the interface will write the value 2 at the bottom of its receive request pool, and load that word in its own FIFO 2. Similarly, if interface 14 transmits a word from its FIFO 5, it will write the value 5 at the bottom of its transmit request pool.

2. A request line RQST (1 per interface) is asserted to the queue manager 10 when the corresponding request pool is not empty. Each request pool receives an acknowledgement signal (ACK) from the queue manager to indicate the request on top of the pool is being serviced. When the ACK is asserted, the corresponding interface will increment a read pointer in the queue manager for the request pool, so that the next request can be provided to the queue manager.

3. A data FIFO that is to be read by the queue manager, such as a receive FIFO of interface 12 or a transmit FIFO of interface 16, will have its read pointer the queue manager incremented when a request for that queue is being ACK'ed.

4. A data FIFO that is to be written to by the queue manager, such as a transmit FIFO of interface 12 or a receive FIFO of interface 16, receives a load signal (LOAD) and a corresponding queue manager queue number (QNUM) when a word has to be loaded into the FIFO of the same number as QNUM.

With the support provided as described above, the queue manager operates as follows:

1. The queue manager reading a word out of an interface FIFO:
   (a) An interface which receives a word to be passed to another interface writes the corresponding queue number into its request FIFO.
   (b) When processing that request, the queue manager will directly transfer the data word to the destination interface if the corresponding queue in local storage 20 is not empty and if there is room in the destination interface FIFO.
   (c) If the destination interface FIFO is full or if the corresponding queue in local storage is not empty, the queue manager will store the word in the local storage queue.
   (d) The queue manager asserts the ACK signal to the request pool when it services that request, or if the request cannot be serviced due to special conditions such as queue overflow or queue disabled.

2. Queue manager writing a word into an interface:
   (a) When operating a direct transfer between interfaces, the queue manager asserts a "LOAD" line and an appropriate "QNUM" to the destination interface, independently of the request being presented by the interface request pool.
   (b) An interface that is transmitting a word to another device writes the corresponding queue number into its request pool.
   (c) The queue manager will service the request if the corresponding queue in local storage is non-empty and if the interface data FIFO is not full. There may be instances where there have been direct transfers of data from another interface into the data FIF0 between the time the request was added to the pool and the same request is serviced. The request pool ACK signal is asserted when the request is serviced. The data FIFO LOAD and QNUM are asserted when the data word is effectively available.
   (d) The request pool ACK signal is also asserted when the request at the top of the pool corresponds to local storage that is empty or if the interface data FIFO is full or if the queue has been disabled.

Table 1 describes the sequence of events which will take place when data has been transmitted between interface 16 down to interface 14 on queue zero. Note that the queue manager is also working on other queues. Assume also that traffic upon queue 0 just started and the transmit queue is empty: The following sequence of events will take place:

| Step | Local Storage Transmit Queue 0 Status | Transmit Interface B Data FIFO 0 Status | Event |
|---|---|---|---|
| 1 | Empty | Empty | Interface 12 gets a word & writes a queue 0 request into its request FIFO. |
| 2 | Empty | Non-Empty | Queue Manager services request for queue 0 through direct transfer to interface 14 data FIFO (LOAD & QNUM=0). Interface 12 updates it request pool. During that process, interface 12 continues to receive words for queue 0 & adds requests for queue 0 into its request pool, one request per word. |
| 3 | Empty | Full | Queue manager now stores data words into local storage queue 0. |
| 4 | Non-Empty | Full | Queue manager continues to write to local storage the words received by interface 16. |
| 5 | Non-Empty | Full | Interface 14 starts transmitting data from queue 0 to the device it is attached to. When transmitting the first word to the device, a request to queue 0 is added to |

| Step | Local Storage Transmit Queue 0 Status | Transmit Interface B Data FIFO 0 Status | Event |
|---|---|---|---|
| 6 | Non-Empty | Non-Full | its request pool. Queue manager continues to write to local storage words received from interface 16. Queue Manager processes interface 14 request for queue 0. It reads the first word in local storage, loads it into interface 14 data FIFO (LOAD & QNUM=0) & acknowledge ACK the request to interface 14 who updates it request pool. During that time, interface 14 continues to transmit words from queue 0 and adds requests into its request pool, one request per transmitted word. Any word received from interface 16 is now written at the bottom of local storage queue 0. Queue manager loads interface 14 data FIFO with words at the top of local storage queue 0. |
| 7 | Non-Empty | Non-Full | Assumes now that interface 16 stops receiving words. Queue manager still processes interface 14 requests the same way by reading out of local storage until it goes empty. |
| 8 | Empty | Non-Full | Interface 14 continues to transmit from its data FIFO 0 & to set requests into its request pool. However, local storage is now empty & requests cannot be serviced. The queue manager simply sets the ACK to interface 16 & the interface updates its request pool. No word is loaded into the data FIFO. |
| 9 | Empty | Non-Full | Interface 16 receives more words for queue 0. Since interface 14 FIFO is not full & the local storage is empty, the queue manager will transfer those words directly to interface 14. |
| 10 | Non-Empty | Full | This situation is similar to step 5. The process is repeated beginning at Step 1. |

As this data transfer process takes place in queue 0, similar data transfers occur on other active queues on the same interfaces and other interfaces. Independent of the number of queues being active in each direction, the queue manager 10 only sees one request at a time per interface, that is the request on top of each request pool. Moreover, the queue manager services request after request, one at a time. Requests are added to the request pools as words are being received or transmitted. An interface can place more requests into its request pool for the queue that has the most traffic, since it transmits or receives more words for that queue. The amount of requests being added to the pool is therefore a function of the activity on each queue which changes dynamically as the activity on a queue changes in time. To the queue manager, this has the effect of requesting a higher quantity, or rate, of service for the queue that has a higher traffic. The overall effect is to allocate the queue manager bandwidth dynamically to the service of the queues according to their respective levels of traffic or activity.

Summarizing, the queue manager only works on an interface basis, not a queue basis. The queue number to service is provided by the interface request pool. A very simple and efficient prioritization scheme can thus be used in the queue manager, such as a round-robin scheme between all interfaces. If more dynamic prioritization is required to give more attention to higher utilized interfaces, other algorithms can be used, such as taking into account the number of outstanding requests into the request pool.

Figure 3A:
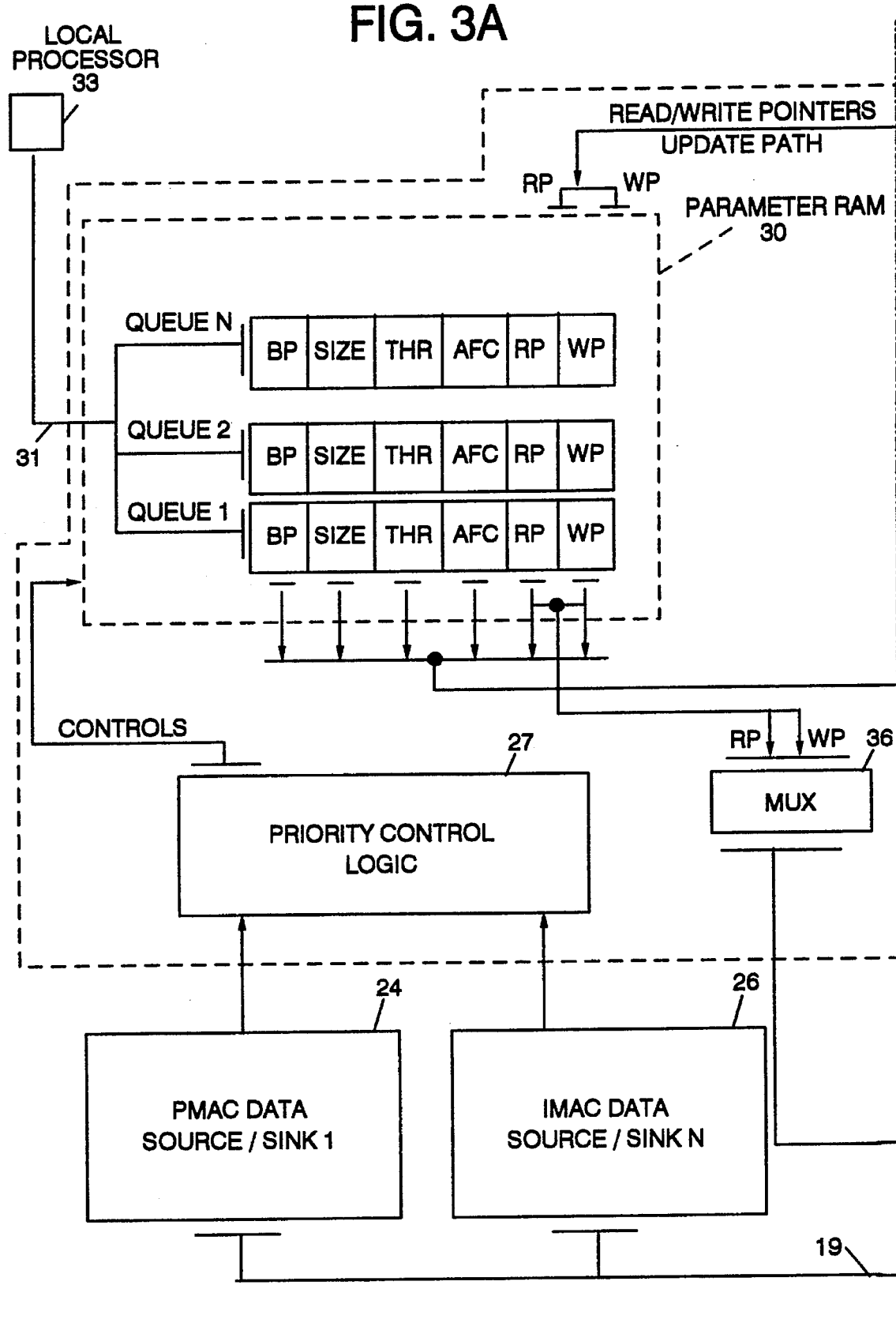

Referring to FIGS. 3A and 3B the queue manager 10 will now be described in more detail. The queue manager enables a user to define and dynamically configure one to "n" queues in storage 20 using programmable control parameters, abbreviated as follows:

(1) Base pointer (BP) that is the starting location in a queue.

(2) Queue size (Size).

(3) write (WP) and read pointers (RP), which are auto-loaded with the base pointer when the base pointer is written.

(4) A threshold limit (THR) which defines a programmable value used to set a threshold status bit when the queue has been filled to a programmable threshold value.

(5) Almost full condition (AFC) which defines another programmable value that sets an "almost full" status bit, when the amount of room left in the queue is less than or equal to this value.

The queue manager permits the reading and writing of the storage as well as providing a comprehensive and elaborate set of status bits, as follows:

(a) Empty (E), which indicates the queue is empty and is set when the base pointer is loaded.

(b) Full (F), which indicates the queue is full and reset when the base pointer is loaded.

(c) Wrapped (W), which indicates the last position of the queue which has been written and the write pointer has been set to base pointer of the queue. The wrapped status bit is reset when the base pointer is loaded.

(d) Threshold value (TH), which is set when the number of words buffered is greater than the threshold parameter. The threshold parameter is reset when the base pointer is loaded.

(e) Almost Full (AF).

In FIGS. 3A and 3B, the memory 20 is shown segmented into N queues for each PMAC or IMAC data source 24, 26. Included in the parameter RAM 30 are a series of registers coupled through a local processor line 31 to a local processor 33. The processor is adapted to program the registers in the parameter RAM. Each set of registers for a queue includes a base pointer (BP); size; threshold (THR); almost full condition (AFC); read pointer (RP); and write pointer (WP). Each register is further coupled to a computation logic 32 through a bus 34. The RP and WP registers, for all queues, are coupled to a multiplexer 36 which is coupled through an address line 19 to storage 20.

Each queue must have its programmable parameters configured before operation commences and is done so via the local bus 31 from the local processor 33 as described in Ser. No. 282,376, filed Jul. 29, 1994, set forth above as a related application.

For each queue, the local processor configures the following six (6) parameters in the parameter RAM:

(1) Base pointer, that is, the starting location in memory.

(2) Queue size.

(3) Threshold.

(4) Almost full control (AFC), the amount of room left in a queue, used to set the almost full status flag.

(5) Read Pointer (RP) which is set to base pointer initially.

(6) Write Pointer (WP) which is set to base pointer initially.

The data source/sink 24 or 26 asserts a request that is prioritized and arbitrated for a winner in a priority and control logic 27, the output of which is provided to a winning queue in the parameter RAM 32. The six parameters of the winning queue are read into the computation logic 32 through the bus 34. The computations in the logic 32 are used to update the status bits of the queue being serviced. The status bits are used by an application running in the data communication system to initiate actions. The read and write pointers read from the parameter RAM are supplied to the multiplexer 36 when accessing the queue in memory, that is the read pointer when reading the queue and the write pointer for writing the queue. The update, that is, the incremented read or write pointer, that is read pointer for read operations, otherwise write pointer, is then written back to the parameter RAM via an update path 38.

Figure 4A:
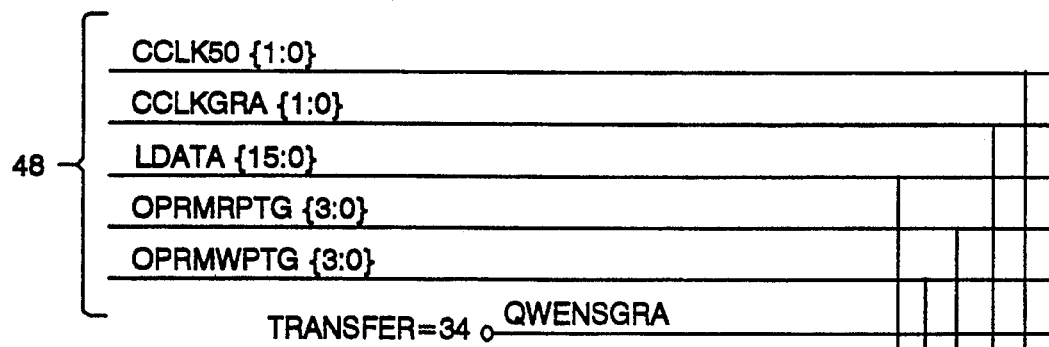

Referring to FIGS. 4A and 4B, the registers included in the parameter RAM 30, (see FIG. 3A) are arranged in four arrays, 40, 42, 44 and 46. Each array is 16-bits wide, and 16 entries deep, one entry for each queue.

A directory of signal inputs to parameter RAM 30 is as follows:

| LADDR | LB | Local Bus Address Bits |
|---|---|---|
| LDATA | LB | Local Bus Write Data Bus input. |
| LFADDR | LB | Local Bus Memory Address. |
| QBSPTR | QM | Queue Manager Parameter RAM Base Pointer. |
| QGATELD | QM | Gate Local Bus Data. |
| QGATEIP | QM | Gate Incremented Pointer. |
| QGATEBP | QM | Gate Base Pointer. |

-continued

| QPRMRPT | QM | Parameter RAM Read Pointer. |
|---|---|---|
| QPRMWPT | QM | Parameter RAM Write Pointer. |
| QINCPT | QM | Incremented Read or Write Pointer Bus. |
| QSELFRA | QM | Select Memory Source Address. |
| QWENRGRA | QM | Write Enable Read Base Pointer GRA. |
| QWENSGRA | QM | Write Enable Size and Base Pointer GRA. |
| QWENTGRA | QM | Write Enable Threshold Value GRA. |
| QWENWGRA | QM | Write Enable Write Pointer GRA. |

The output signal set definitions are as follows:

| QBSPTR | QM | Base Pointer. |
|---|---|---|
| QFADDR | QM | Selected Memory Address Bus. |
| QPRMDT | QM | Queue Parameter RAM Read Data for Local Bus. |
| QRDPTR | QM | Parameter RAM Read Pointer. |
| QSIZE | QM | Base Pointer (15:8) and Size (7:0). |
| QTHRESH | QM | Parameter RAM Threshold Value. |
| QWRPTR | QM | Parameter RAM Write Pointer. |

A first set of data selectors 48 and a second set of data selectors 50 are used to gate the appropriate source to the read pointer 44 and write pointer 46 array. The first set of selected input signals is provided to arrays 40–46. The second set of selected input signals 50 is provided solely to the read pointer 44 and write pointer arrays.

The data sources to the arrays 44, 46 can be:

(a) Data from the local processor bus when configuring the arrays.

(b) The incremented read/write pointer after each read/write operation.

(c) The base pointer stored in the array 40, after accessing the top word of the queue.

The output signals from the arrays are used to select the memory address on a bus 68 which includes the address from the local processor for direct addressing, the write pointer when data is being (1) written into the queue and the read pointer when the data is being read from the queue and (2) gate the output of any of the four parameter RAM arrays to the processor on the bus 31.

The function of array 40 is to maintain the base and size parameter for each queue. Bits 0:7 specify the queue size and multiples of 256 words. Bits 8:15 specify the base pointer of each queue. Only 8 bits are needed since queues must begin on 256 word boundaries which implies the low order 8-bits of this pointer must be 0.

Array 42 contains the threshold values which for transmit queues may control the number of words that must be in the queue before starting to transmit the words of the queue to the ring. For receive queues, the threshold may be used to control when the interface 16 will be signaled to start unloading a queue.

The array 44 contains the read pointer value used to address the next word to be read from storage 20. The pointer can be written by software with its own unique address or whenever the base pointer is written. The read pointer will be updated after every hardware controlled memory read from the queue.

The array 46 contains a write pointer value used to address where the next word will be written into storage 20. The write pointer can be written by software with its own unique address or whenever the base pointer is written. The write pointer will be updated after every hardware controlled memory write to the queue.

It should be noted the hardware update operation for the read and write pointers is to increment them by 1 until they equal the calculated limit which is equal to the base pointer plus the queue sized parameter. When this equal condition is detected, the pointer being updated is set to the base pointer value.

Figures 5, 5A:
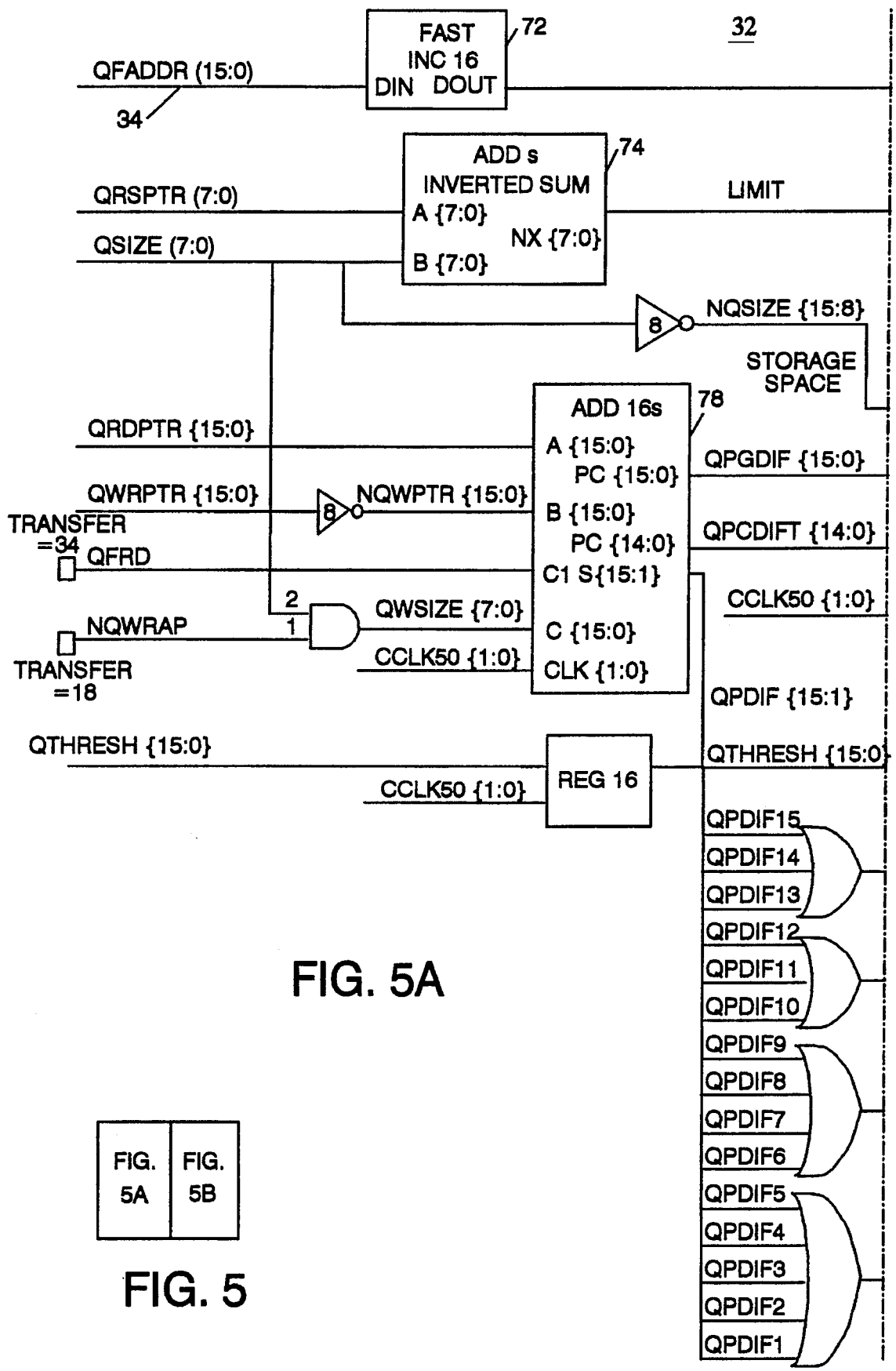
FIG. 5 is an orientation diagram of FIGS. 5A and 5B for computation logic included in the queue management system of FIG. 3.
FIGS. 5A and 5B are block diagrams for computation logic included in the queue management system of FIG. 3.
Figure 5B:
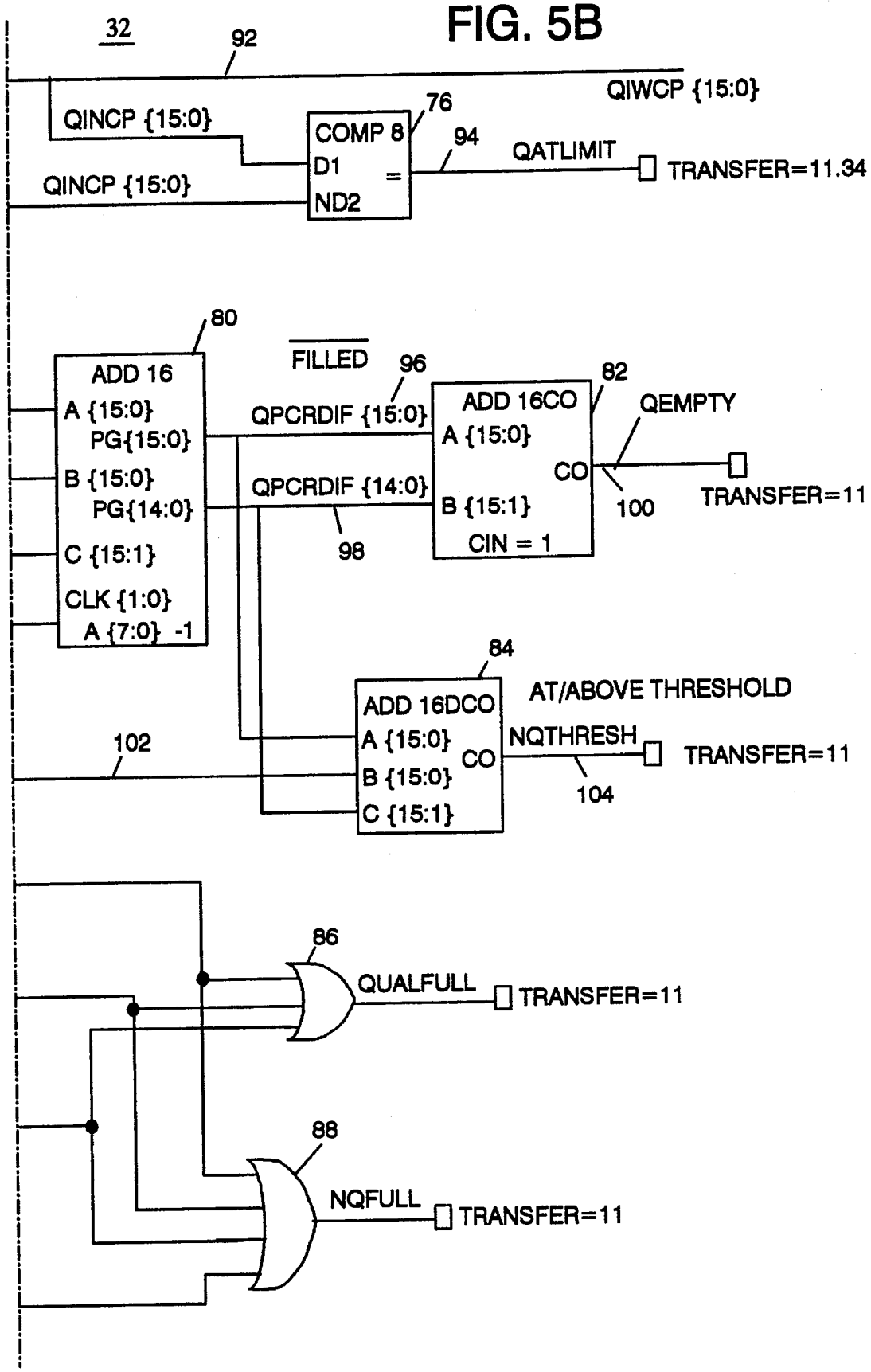

Referring to FIGS. 5A and 5B, a detailed description of the computation logic 32 (see FIG. 3B) is provided The signal dictionary for the computation logic is as follows:

| Inputs Signal Sets: | | |
|---|---|---|
| QBSPTR | QM | Parameter RAM Base Pointer. |
| QFADDR | QM | Selected Memory Address Bus. |
| QFRD | QM | Memory Read Access Priority. |
| QRDPTR | QM | Parameter RAM Read Pointer. |
| QSIZE | QM | Parameter RAM Size Value. |
| QTHRESH | QM | Parameter RAM Threshold Value. |
| QWRAP | QM | Parameter RAM Write Pointer Wrapped. |
| QWRPTR | QM | Parameter RAM Write Pointer. |
| Outputs Signal Sets: | | |
| QINCP | QM | Incremented Memory Address Bus. |
| QATLIMIT | QM | Incremented Memory Address at Limit. Load Base Pointer. |
| QEMPTY | QM | Queue Empty. |
| QTHRESH | QM | Queue Has Been Filled to Threshold Value. |
| NQALFULL | | Queue Has Been Filled to Within 65 Words of Full. |

Figure 4A:
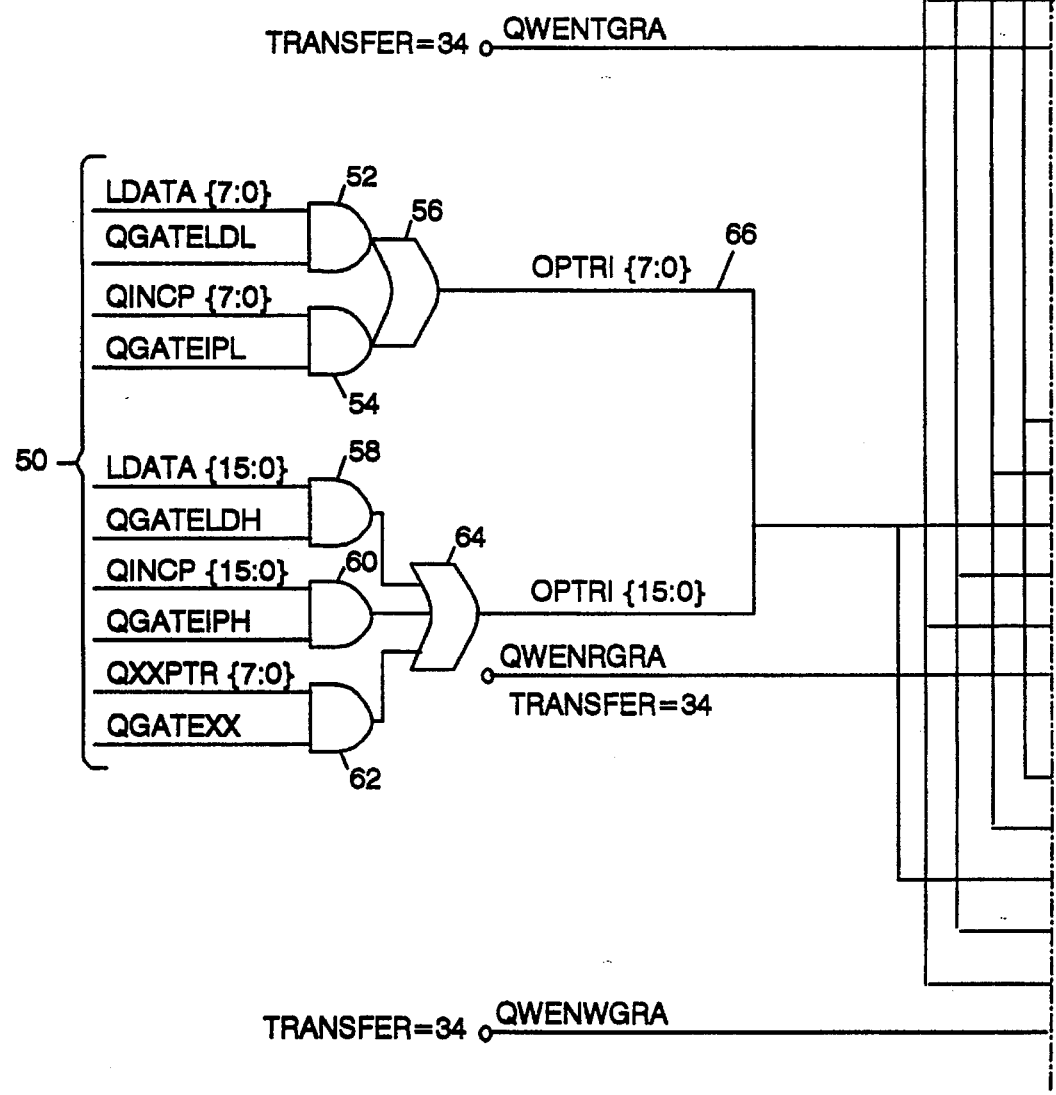

The inputs to the computation logic 32 are the parameters from FIG. 4 and its output control signals (Queue at Limit, Queue Empty, Queue Threshold, Queue Almost Full) used to update the status bits for the queue being serviced. The computations performed by the logic 32 are as follows:

An incrementer 72 increments the memory address on the line 34.

Limit calculation logic 74 determines the value of the top of the queue, which is compared with the incremented memory address in a comparator 76 to control gating the base pointer into the read/write pointer array 44, 46.

Storage space calculation logic elements calculate the remaining space not filled in the queue. A two-input adder 82 generates a carry when the queue is empty. A 3-input adder 84 generates a carry when the amount filled in the queue is equal to or greater than the threshold value in the queue. An AND circuit 86 generates an "Almost Full" signal and an AND circuit 88 generates a "Full" signal for the queue. The full sum of space adder is zero-detected to produce full and almost full status control signals.

The operation of the computation logic is as follows:

The selected pointer address on signal line 34 is incremented by using the fast incrementing 16 logic block 72 which produces the queue bus signal 92 that is the updated pointer written back to the read or write pointer parameter RAM. The add 8 inverted sum logic block 74 adds the base and size parameter to produce the queue limit that is the top location of the queue. This value is compared to the incremented pointer to produce the queue at limit signal 94. This signal causes the base pointer instead of the incremented value to be gated to the read or write pointer parameter RAM. When the write pointer is updated, the wrapped bit will be set with the read pointer, the wrap bit is reset. The amount of room remaining in the queue id computed using the following algorithm:

Room Temp 1=Memory Read Pointer+1's complement of MEMORY WRITE PTR.

If Read Operation Then

Room. Temp 2=Room. Temp 1+2

Else

Room. Temp 2=Room. Temp 1

If Memory WRITE POINTER>MEMORY READ POINTER (i.e., Wrap Queue Status Off) Then

Room=Room. Temp 2+Size

Else

Room=Room. Temp 2

The add 16S block 78 calculates the number of words unfilled (ROOM) in the memory queue by adding the read pointer to the 1's complement of the write pointer. To minimize circuit delay and to simply logic, the 1's complement is fed directly from the read and write parameter RAM, instead of from the read write pointer incrementer 72. To account for this, the adder 78 output is adjusted for memory writes by using the 1 complements instead of the 2's complements and for the memory reads by adding the value of 2 to the computation. Also, if the wrap queue status bit is off, the size parameter must also be added to obtain the true room value.

The add 16S block 78's implementation is a 3-input partial sum and partial carry adder. The partial sum and partial carry output buses feed the next logic block 80 by-passing the carry propagation logic eliminating additional needless circuit delay.

The "QPDIF" bus is the output of a two-input adder fed by the partial sum and partial carry busses mentioned above including the full carry look-ahead propagation logic providing the ROOM value. This sum is fed to the zero detect logic which is used to generate Queue "Full" and "Almost Full" status bits.

The "NOTHRESH" indicates At or above "Threshold" and "Qempty".

The add 16 block adds the previously calculated room value to the 1's complement value of size, this yields the 1's complement of the amount filled in the queue. When the queue is empty, the sum of signals QPSRDIF which appears on bus 90 and QPCRDIF which appears on bus 98 will equal "FFFF". The logic block 82 or add 16CO adds these two buses along with the carry in to bit 0, so when the queue is empty, the signal "Qempty" will appear on bus 100. This implementation saves logic and delay to produce a sum bit. The 1's complemented "filled" calculation previously mentioned is also used to calculate where the queue is at or above threshold. This is accomplished by adding in logic block 84 the threshold parameter for the queue which appears on line 102 to the filled value which appears on lines 96 and 98, thereby effectively comparing the two values. A carry out of logic 84 means the queue is at or above threshold which appears on line 104.

In summary, this computation saves cue count and minimizes circuit delay by extensive use of carry look ahead logic; a partial sum and partial carry buses to avoid carry propagation delays when possible and the use of high order carry out signals instead of the actual adder sum buses when possible.

The queue manager 10 provides these features: Logic that places and retrieves data in queues that are managed as circular FIFO's. Programmable to define to each queue that is its starting location, size, etc., in the parameter RAM. An elaborate set of status bits and a parameter RAM and status bits which are expandable, for example, half-full status bits can be divided. Other parameters can be included in the parameter RAM. For example, some FIFO's may be managed using 3 pointers. While the present invention has been disclosed and described with respect to a preferred embodiment thereof, it will be understood by those skilled in the art that various changes in form and detail may be made therein without departing from the spirit and scope of the invention.

We claim:

1. In a data communication system handling packet and multimedia data transferred in either direction between a host bus and a network, a queue manager for managing multiple circular FIFO storage means included in the system, comprising:

(a) a programmable parameter RAM including a base pointer array, a threshold array, a read pointer array and a write pointer array;
   each array having two sides, one side of each array coupled to an input selector, the other side of each array coupled to a first output selector, the read and write pointer arrays being further coupled to a second output selector;

(b) computation logic means coupled to the first and second output selectors and including a first calculating means, a second calculating means, and logic means, the first calculating means calculating a queue limit that is the top location of the queue and providing an output signal "qatlim";
   the second calculating means calculating the amount of space remaining in a queue and providing a queue empty signal or a queue at or above threshold signal;

(c) the logic means coupled to the second calculating means for providing a queue almost full or queue full signal;

(d) means coupled to the first selector for programming the parameter RAM; and (e) status means coupled to the computation logic means for receiving the empty, full, wrapped, almost full, and threshold signals for use by an application running in the system in receiving data from or sending data to the multiple circular FIFO storage means.

2. A method of generating signals useful in a queue manager for managing multiple circular FIFO storage means in handling incoming/outgoing data in a data communication system comprising the steps of:

(a) providing to a first calculating means a selected pointer address in the circular FIFO storage means;

(b) providing as a first output from the first calculating means an incremented selected pointer address;

(c) providing to the first calculating means a base and size signal and providing as a second output signal a queue limit signal or the top location of a queue;

(d) providing to a second calculating means a read pointer signal, a write pointer signal, a wrapped signal, and a memory access signal to generate a queue empty signal from the second calculating means;

(e) providing as inputs to a third calculating means a threshold signal, a write pointer and a read pointer signal to generate as an output an at/above threshold signal; and (f) providing as an input to a logic means a data signal from each queue and generating as output signals a queue full or queue almost full signal, the signals generated in steps (c)–(f) used by the queue manager in managing incoming/outgoing data in the data communication system.

3. In a data communications system handling packet data and multimedia data transferred in either direction between a host bus and a network, a queue manager for managing multiple circular FIFO queue storage means included in the system, comprising:

a programmable parameter RAM having as programmable parameters (i) a base pointer for each queue storage means identifying the starting location in the storage means; (ii) queue size or quantity of data; (iii) a threshold value indicative of when data can be transferred out of a queue; an "almost full" control indication of the amount of space or room left in a queue and used to set an "almost full" status line; (iv) a read pointer initially set to the base pointer; and (v) a write pointer initially set to the base pointer;

computation logic exercising the programmable parameters to generate control signals used to update status bits for a queue being serviced by the queue manager;

and status means coupled to the computation logic for receiving an "empty", "full", "wrapped", "almost full", and threshold signals used in receiving data from or sending data to the multiple circular FIFO queue storage means.

4. In the data communication system of claim 3, the computation logic including a first three input adder for calculating the one's complement of the data filed in the winning queue;

a two input adder for generating a carry signal when the winning queue is "empty"; and a second three input adder generating a signal when the data in the winning queue is equal to or greater than a threshold value set by the winning queue.

5. In the data communication system of claim 4, the queue manager adapted to simultaneously store data from the host or network interfaces in a receive queue while transmitting data to the host or network interface from the transmit queue.

6. In the data communication system of claim 4, the queue manager adapted to store data transferred between the host and network interfaces in local storage before transferring data to or from the multiple circular FIFO queue storage means.

7. In a data communications system handling packet data and multimedia data transferred in either direction between a host bus and a network, a queue manager for managing multiple circular FIFO queue storage means included in the system, comprising:

a priority control circuit responsive to a packet data source/sink and an isochronous data source/sink for selecting the data having the highest priority and providing an output to a programmable parameter RAM indicating a winning queue for storing the data;

a programmable parameter RAM providing a plurality of parameters descriptive of the winning queue;

computation logic receiving the parameters from the programmable parameter RAM and calculating the space or room available in the winning queue for storing the data having the highest priority; and status means coupled to the computation logic for providing signals to an application running in the system for handling data to and from the multiple storage queues.

8. In the data communications system of claim 7, the storage means further divided into receive and transmit queues and both the host and network interfaces including local storage.

9. In the data communication system of claim 7 further including a local processor for programming the parameter RAM in response to a user input.

10. In a data communications system handling packet data and multimedia data transferred in either direction between a host bus and a network, a queue manager for managing data transferred among a host interface, a network interface and a storage interface including multiple queue storage means, comprising:

- a programmable parameter RAM for generating signals indicative of the data storage status of each queue included in the storage means;
- computation logic coupled to the programmable parameter RAM for receiving signal descriptive of a queue selected for storing data;
- the computation logic generating computed signals determining when a queue is "full", "empty", "almost full", or "at/above threshold"; and
- status means for receiving the computed signals for controlling an application running in the system to receive data from or sending data to a multiple queue storage means.

11. In a data communications system handling packet data and multimedia data transferred in either direction between a host bus and a network bus, a queue manager for managing the transfer of data among a plurality of interfaces coupled to the host, the network and a storage means including multiple queues, comprising the steps of:

(a) reading a word out of the storage interface comprising the steps (i) writing the corresponding queue number into a request queue for a word to be passed to a destination interface; (ii) transferring the data word to the destination interface if the corresponding queue is "empty" and if there is room in a destination interface queue; (iii) storing the word in a local storage queue if the destination interface queue is "full" or if the corresponding queue and local storage is "empty"; and (iv) asserting an acknowledge signal to a request pool when the request to service or if the request cannot be serviced due to special conditions such as queue overflow or queue disabled;

(b) writing a word into a host or network interface comprising the steps of: (i) operating a direct transfer between the interfaces via asserting a "load" line and appropriate "close queue NUM" line to the destination interface independently of a request being presented by the interfaces; (ii) writing the corresponding queue number into a request pool for an interface that is transmitting a word to another device; and (c) servicing the request if the corresponding queue in local storage is "not empty" and if the interface data is "not full"; asserting an acknowledge signal when the request at the top of the pool corresponds to local storage that is "empty" or if the interface data queue is "full" or if the queue has been "disabled".

* * * * *